United States Patent
Thomas

(10) Patent No.: US 11,914,711 B2
(45) Date of Patent: Feb. 27, 2024

(54) SYSTEMS AND METHODS FOR AUTOMATICALLY GENERATING MALWARE COUNTERMEASURES

(71) Applicant: Versa Networks, Inc., San Jose, CA (US)

(72) Inventor: Winny M. Thomas, Bangalore (IN)

(73) Assignee: Versa Networks, Inc., San Jose, CA (US)

( * ) Notice: Subject to any disclaimer, the term of this patent is extended or adjusted under 35 U.S.C. 154(b) by 278 days.

(21) Appl. No.: 16/944,079

(22) Filed: Jul. 30, 2020

(65) Prior Publication Data

US 2022/0035920 A1 Feb. 3, 2022

(51) Int. Cl.
*G06F 21/00* (2013.01)
*G06F 21/56* (2013.01)

(52) U.S. Cl.
CPC .......... *G06F 21/568* (2013.01); *G06F 21/566* (2013.01); *G06F 2221/034* (2013.01)

(58) Field of Classification Search
CPC . G06F 2221/034; G06F 21/566; G06F 21/568
USPC ........................................................ 726/23
See application file for complete search history.

(56) References Cited

U.S. PATENT DOCUMENTS

| | | | | |
|---|---|---|---|---|
| 8,484,334 B2 * | 7/2013 | Sievers-Tostes | ...... | G06F 9/5038 709/224 |
| 9,372,995 B2 * | 6/2016 | Shigemoto | ............ | G06F 21/577 |
| 9,792,444 B2 * | 10/2017 | Hoglund | ................. | G06F 21/57 |
| 9,916,440 B1 * | 3/2018 | Paithane | ................. | G06F 21/53 |
| 11,074,345 B2 * | 7/2021 | Dawson | ............... | G06F 21/567 |
| 2007/0283434 A1 * | 12/2007 | Cohen | ................... | G06F 21/554 726/22 |
| 2008/0016339 A1 * | 1/2008 | Shukla | ..................... | G06F 21/54 713/164 |
| 2014/0237596 A1 * | 8/2014 | Grytsan | ................ | G06F 21/566 726/23 |
| 2018/0181455 A1 * | 6/2018 | Ishibashi | ............. | G06F 11/0751 |
| 2021/0112091 A1 * | 4/2021 | Compton | ............ | H04L 63/1416 |
| 2021/0117544 A1 * | 4/2021 | Kurtz | ..................... | G06F 21/577 |
| 2021/0365556 A1 * | 11/2021 | Summerlin | ........... | G06F 21/564 |
| 2022/0027475 A1 * | 1/2022 | Seth | ........................ | G06F 21/53 |

FOREIGN PATENT DOCUMENTS

JP 2016099857 * 5/2016 ............. G06F 21/56

* cited by examiner

*Primary Examiner* — Josnel Jeudy
(74) *Attorney, Agent, or Firm* — LOZA & LOZA, LLP

(57) ABSTRACT

Malware can be automatically detected and countermeasures automatically generated. A virtual machine (VM) is run with an operating system configured with a monitoring subsystem. The monitoring subsystem is configured to generate event data based on events occurring on the virtual machine. The monitoring subsystem can run within the operating system kernel. Kernel drivers can register to receive specific events. The events are therefore sent to the drivers, which can send them to a classifier. The classifier can detect malware based on the events. When a sample is run on the VM, the classifier can detect malware in the sample. While running the sample, event data is collected. A countermeasure compiler can generate a countermeasure to the malware, the countermeasure based on the event data.

15 Claims, 15 Drawing Sheets

SYSTEMS AND METHODS FOR AUTOMATICALLY GENERATING MALWARE COUNTERMEASURES

TECHNICAL FIELD

The embodiments herein virus detection, malware detection, virtual machines, and more particularly, to automatically generating countermeasures to malware running in a virtual machine.

BACKGROUND

Key aspects of computer security and protecting private data include detecting malware and keeping computers free of malware. Malware includes viruses and ransomware Viruses hijack a computers resources or steal data from the computer. Ransomware encrypts a data on a computer, usually a user's data, and demands a ransom. The ransom is supposed to pay for a decryption key or decryption of the data. The production of and distribution of malware is a thriving industry that has necessitated the similarly thriving industry of malware detection and removal.

Current malware detection techniques include looking for malware within samples by comparing sample contents to known malware. Other techniques include purposely infecting a computer with malware and cataloguing the computer's activities. Anti-malware experts examining the catalogued activities can determine a signature for the malware and can develop a countermeasure to the malware. Developing and deploying countermeasures is a time consuming activity currently performed by a limited number of experts and computer malware researchers.

Malware creators analyze the expert's countermeasures and deploy new malware that avoids those countermeasures. The anti-malware experts create additional countermeasures as the new malware is discovered. The cycle of malware creation, detection, and countermeasure seems endless.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to a method comprising running a virtual machine with an operating system configured with a monitoring subsystem. The monitoring subsystem can be configured to generate event data based on a plurality of events occurring on the virtual machine. The method can also comprise running a classifier configured to detect a malware based on the plurality of events, running a sample on the virtual machine, the classifier detecting the malware in the sample, and running a countermeasure compiler that generates a countermeasure to the malware, the countermeasure based on the event data.

In some examples, the monitoring subsystem runs within a kernel of the operating system. The monitoring subsystem can be configured to monitor any one or more of a process, a file, a filesystem, an operating system registry, a registry entry, and a network, The classifier can be configured to run within the operating system kernel and can be configured to detect the malware based on one or more of the following:

a. a type of access to the process requested by the sample,
b. an identity of the process accessed by the sample,
c. the sample modifying a tripwire file monitored by the monitoring subsystem,
d. the sample modifying a system file monitored by the monitoring subsystem,
e. the sample terminating a process monitored by the monitoring subsystem and that is not associated with the sample, or
f. the sample modifying or deleting a registry entry that the sample did not create.

In some examples, detecting the malware triggers generating the countermeasure. The countermeasure compiler can be configured to generate a resource data section wherein the countermeasure includes a precompiled template populated with the resource data section. The countermeasure can also be configured to run on a computer, detect the malware on the computer, remove the malware from the computer, or prevent the computer from running a malware process.

In some examples, the monitoring subsystem can be configured to do any one or more of the following: monitor a first process not associated with the sample, monitor a second process, monitor a tripwire file, monitor a system file. The classifier can be configured use an event data object in transient memory and, based on the plurality of events to detect the malware based on at least two of the events or at least one of: the sample modifying the tripwire file, the sample modifying the system file, the sample terminating the first process, a type of access to the second process requested by the sample, an identity of the second process accessed by the sample, and the sample modifying or deleting a registry entry that the sample did not create. The countermeasure compiler can be configured to generate a resource data section by compiling an analysis log file comprising the event data, the analysis file not visible to the virtual machine. The countermeasure can include a precompiled template populated with the resource data section and can be configured to: run on a computer, detect the malware on the computer, remove the malware from the computer, and prevent the computer from running a malware process.

Various aspects of the disclosure relate to a system comprising a virtual machine running an operating system, the virtual machine configured to run a sample comprising a malware. The system can also comprise a monitoring subsystem running on the virtual machine and configured to generate event data based on a plurality of events occurring on the virtual machine. The system can additionally comprise a classifier configured to detect the malware based on the plurality of events. The system can further comprise a countermeasure compiler configured to compile an analysis log file including the event data to generate a countermeasure to the malware. The classifier can be configured to use an event data object in transient memory and based on the plurality of events to detect the malware based on at least two of the plurality of events. The monitoring subsystem and the classifier can run within a kernel of the operating system and generating the countermeasure can be triggered by detecting the malware.

Various aspects of the disclosure relate to a non-transitory computer readable medium storing computer readable instructions, that when executed on one or more processors, implements a method. The method can comprise one or more of the following:

a. running a virtual machine with an operating system configured with a monitoring subsystem, the monitoring subsystem configured to generate event data based on a plurality of events occurring on the virtual machine,
b. running a classifier configured to detect a malware based on the plurality of events,
c. running a sample on the virtual machine, the classifier detecting the malware in the sample, or
d. running a countermeasure compiler that generates a countermeasure to the malware, the countermeasure based on the event data.

In some examples, the non-transitory computer readable medium storing computer readable instructions implements a method wherein the monitoring subsystem is configured to do at least one of: run within a kernel of the operating system, monitor a first process not associated with the sample, monitor a second process, monitor a tripwire file, or monitor a system file. Furthermore, the classifier can be configured to detect the malware based on one or more of: the sample modifying the tripwire file, the sample modifying the system file, the sample terminating the first process, a type of access to the second process requested by the sample, or an identity of the second process accessed by the sample.

In some examples, the countermeasure can be stored on a second non-transitory computer readable medium storing additional computer readable instructions, that when executed by a computer, implements a countermeasure method comprising detecting the malware on the computer or removing the malware from the computer.

BRIEF DESCRIPTION OF THE FIGS

The embodiments herein will be better understood from the following detailed description with reference to the drawings, in which.

Figure 10A:
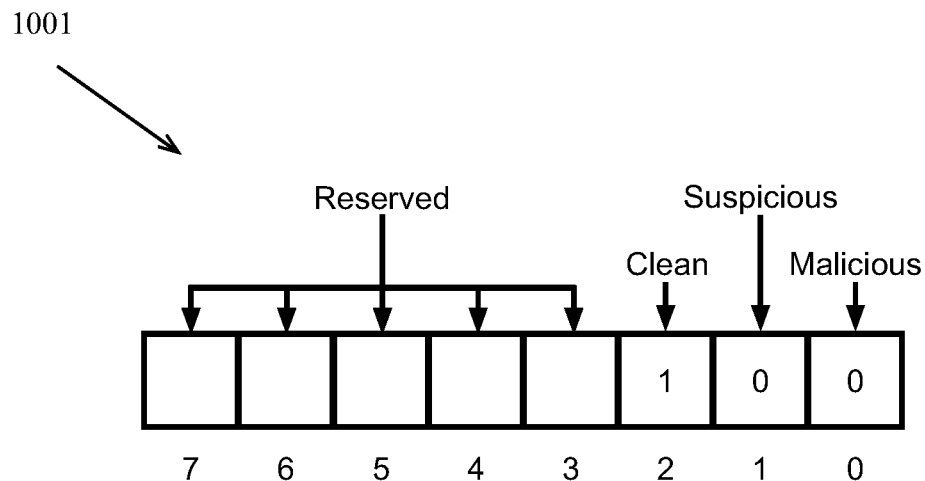
Figure 10B:
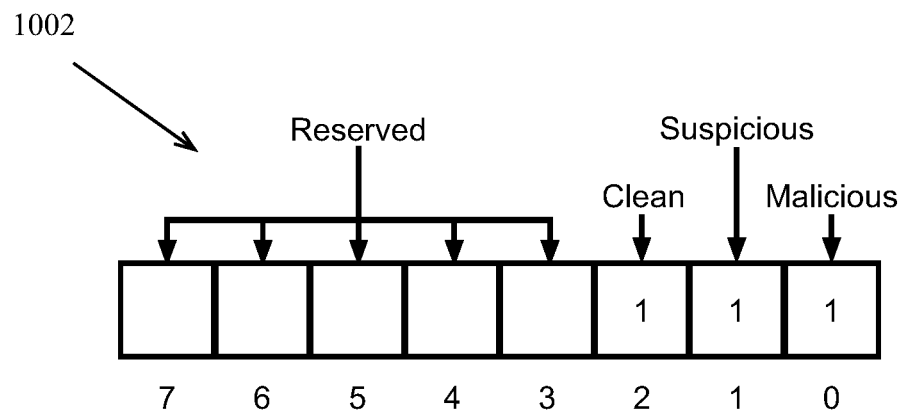
Figure 11:
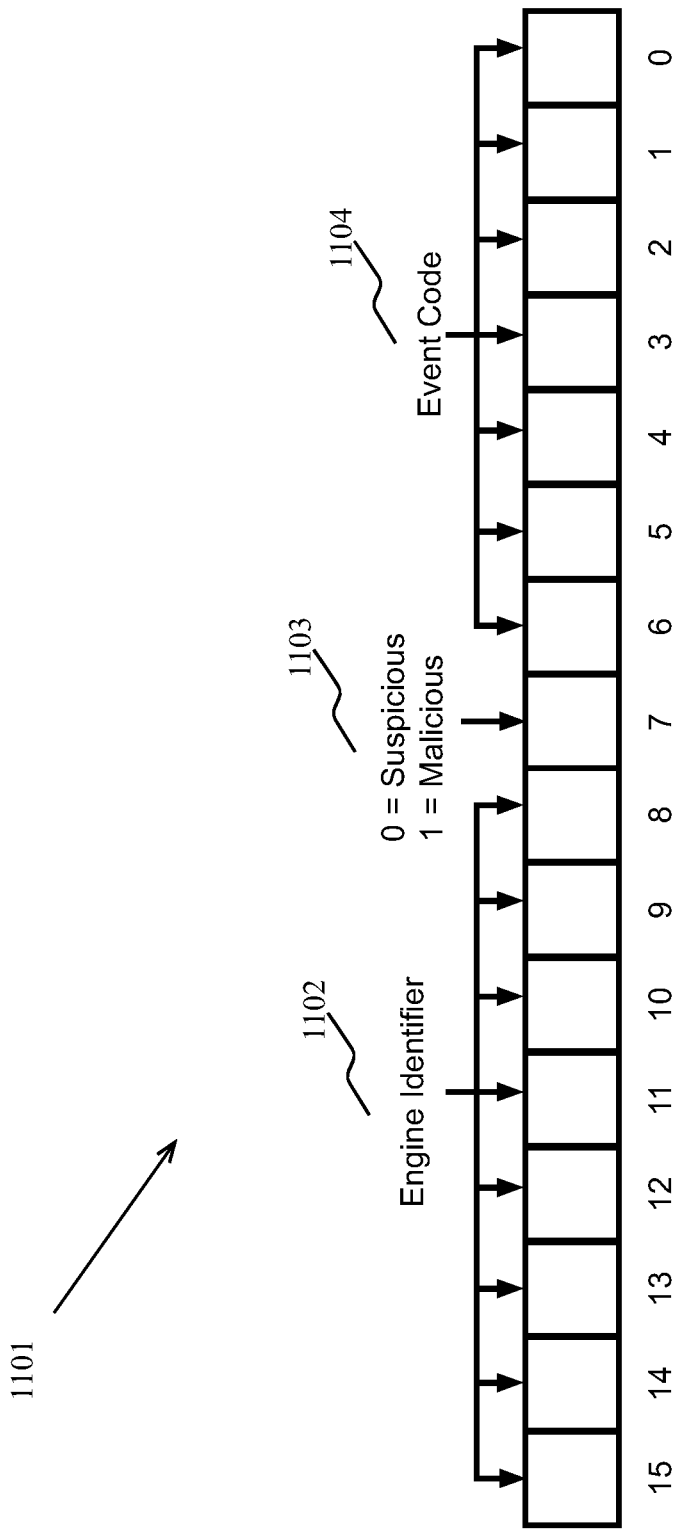
Figure 12:
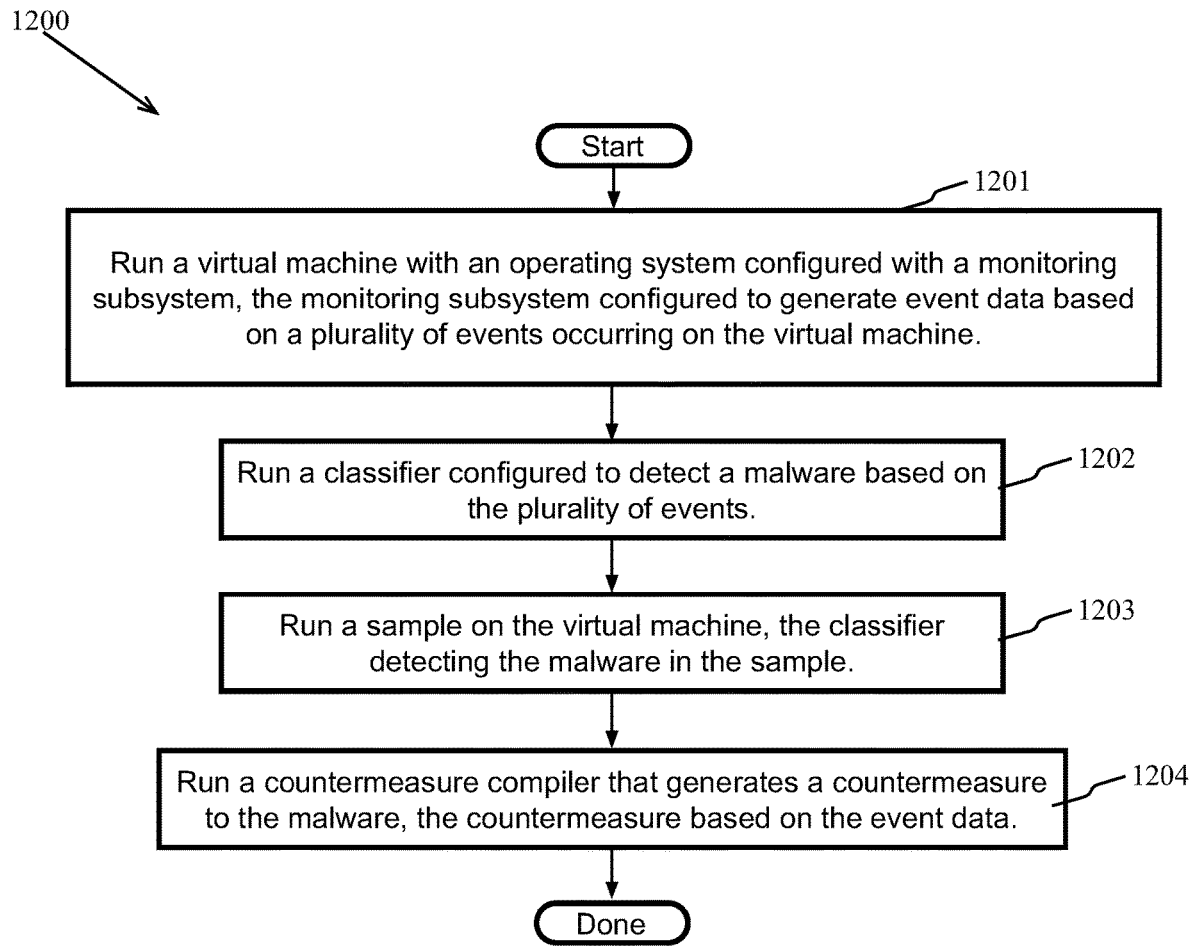
Figure 13:
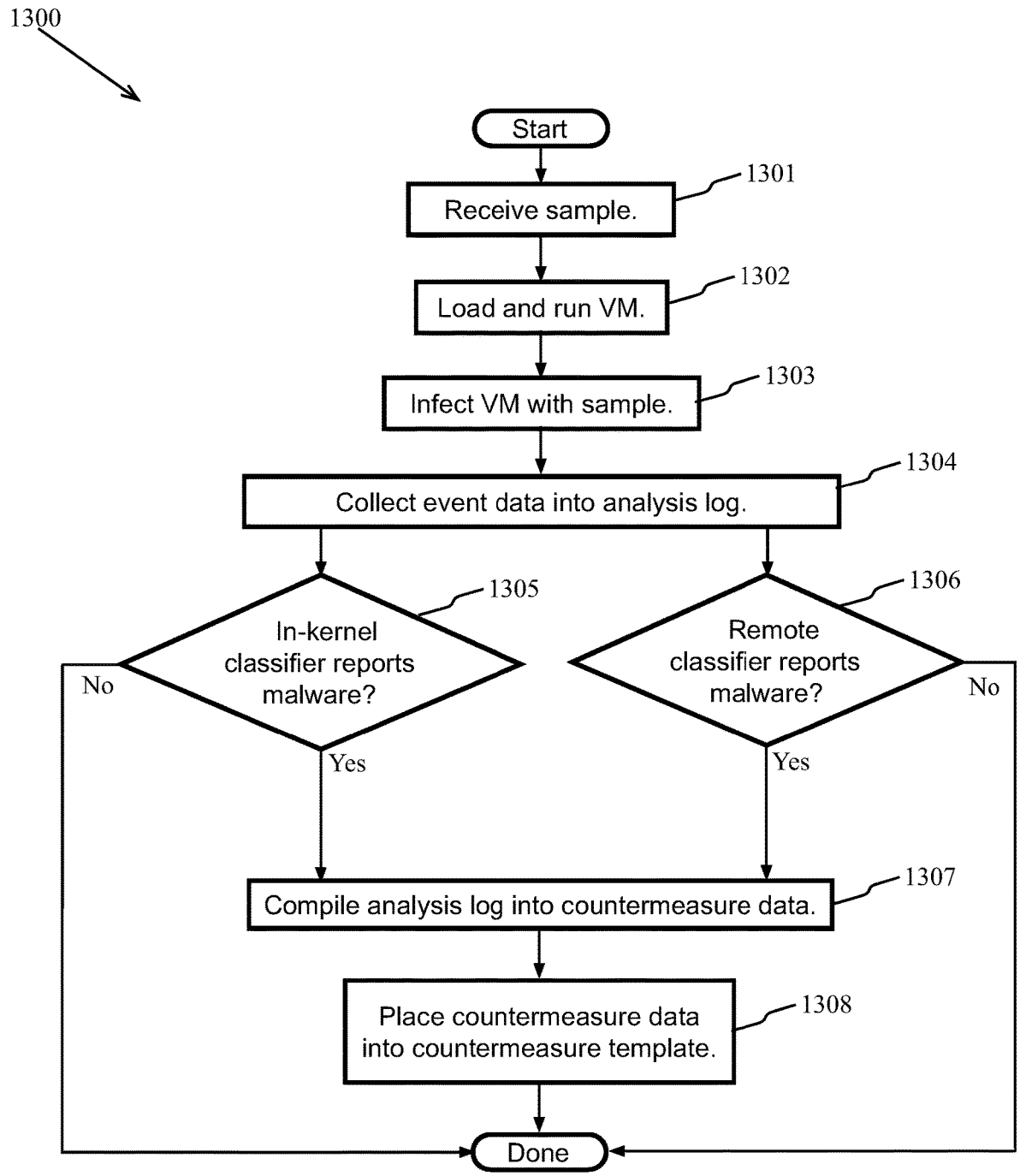
Figure 14:
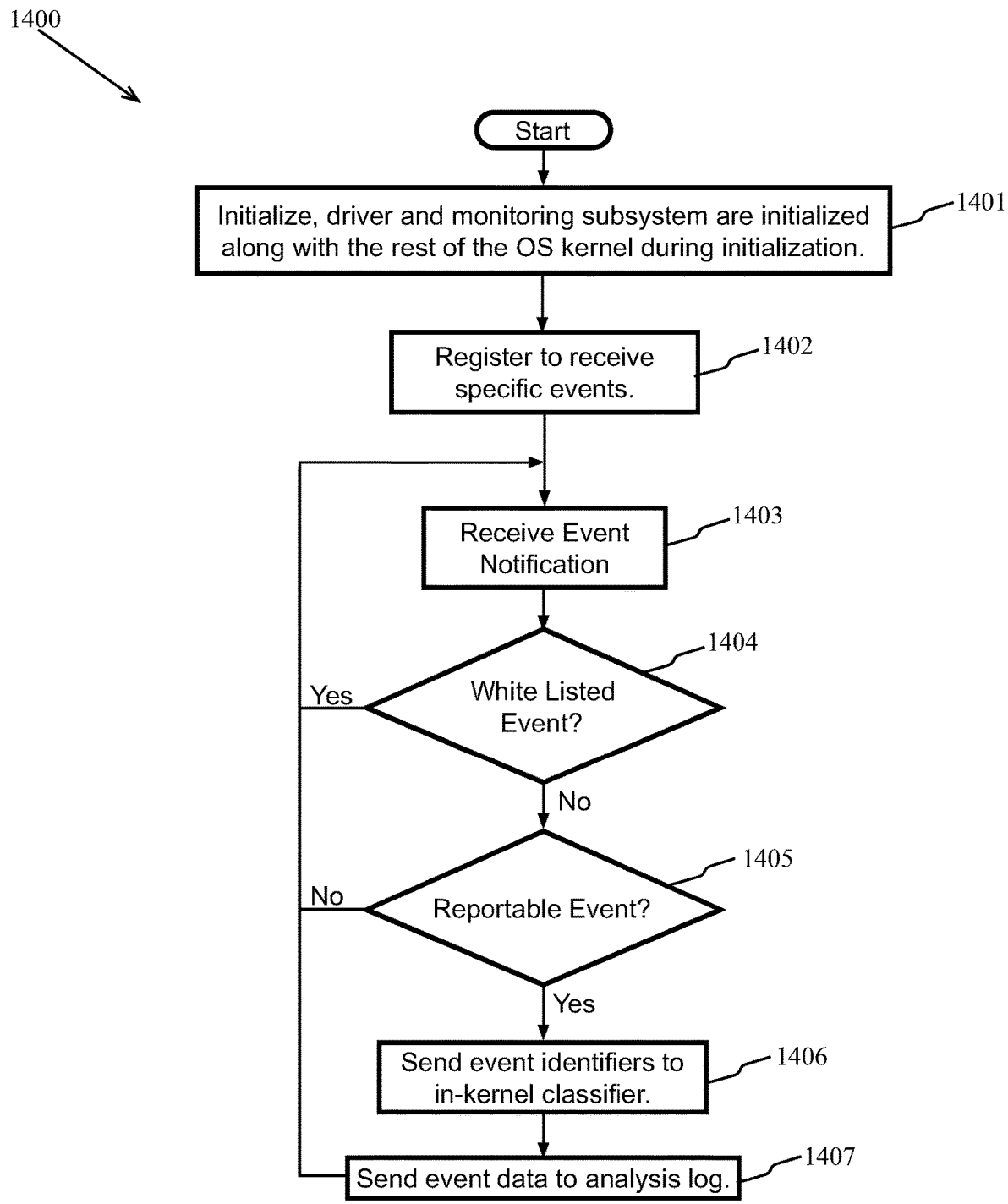
Figure 15:
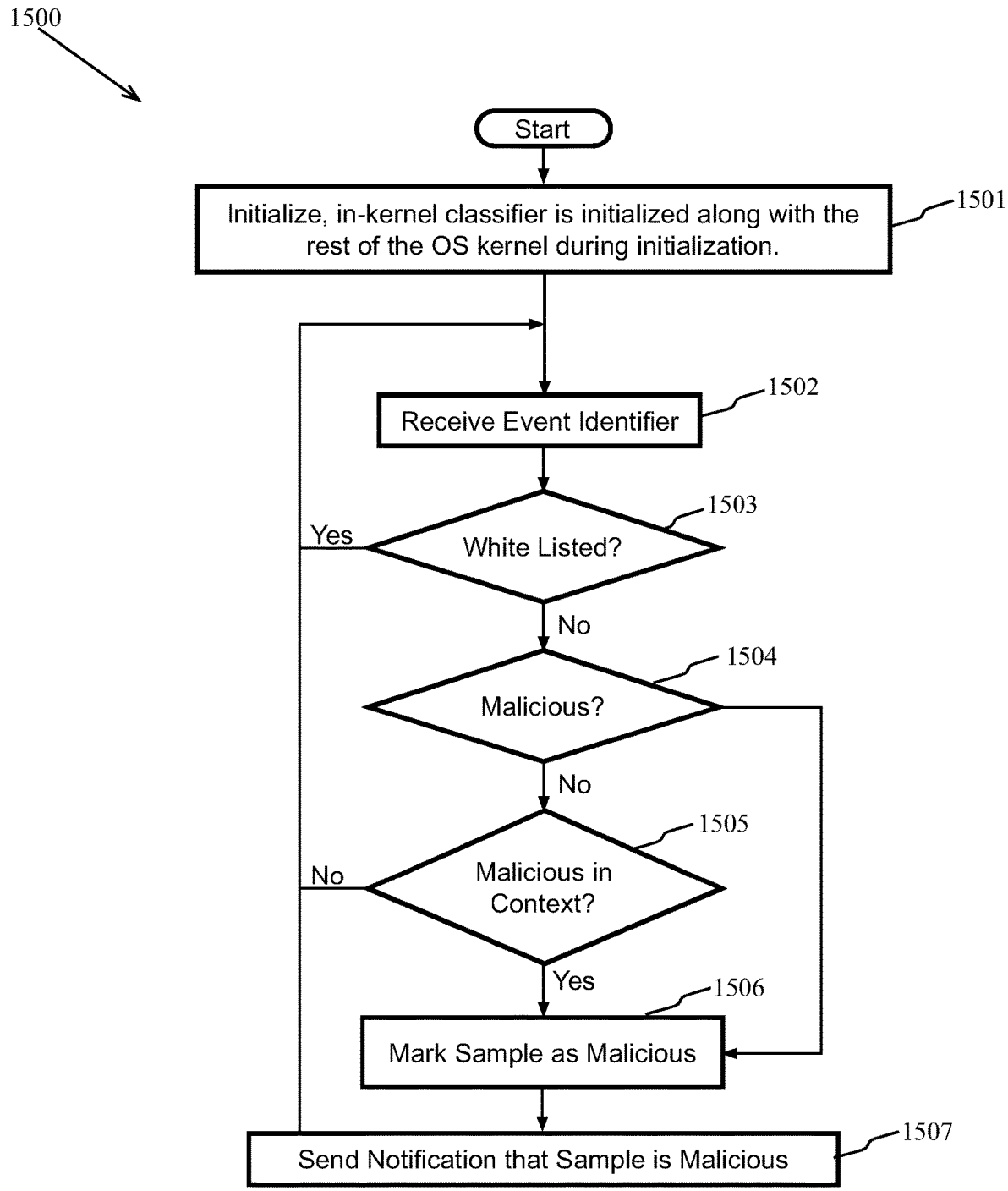
Figure 16:
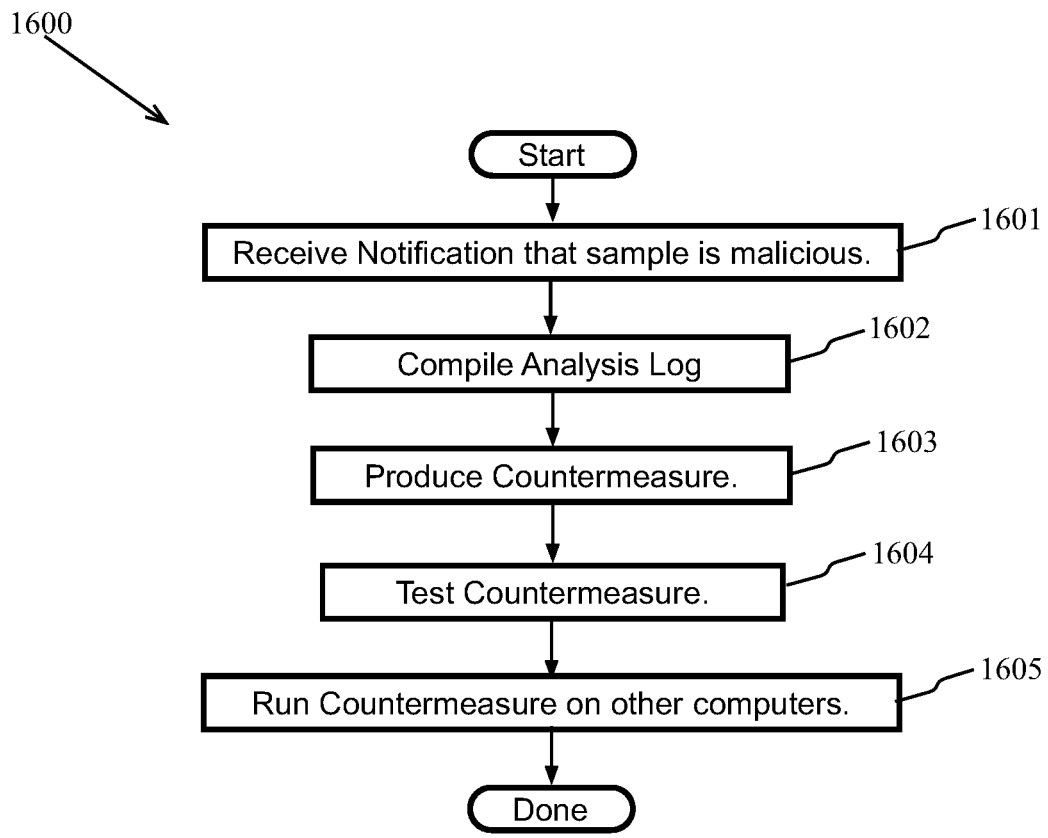

FIG. 10, which includes FIGS. 10A and 10B, illustrates non-limiting examples of a sample classification datum, according to embodiments disclosed herein;

FIG. 11 illustrates a non-limiting example of an event identifier, according to embodiments disclosed herein;

FIG. 12 illustrates a method for automatically detecting malware and generating countermeasures, according to embodiments disclosed herein;

FIG. 13 illustrates a method for a host machine to automatically classify a sample and generate a countermeasure, according to embodiments disclosed herein;

FIG. 14 illustrates a process for an in-kernel monitoring subsystem, according to embodiments disclosed herein;

FIG. 15 illustrates a process for an in-kernel classifier, according to embodiments disclosed herein; and FIG. 16 illustrates automatically producing, testing, and deploying a countermeasure, according to embodiments disclosed herein.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Anti-Virus (AV) engines typically rely on MD5 hashes from previous analysis, heuristic engines that analyze anomalies in file structure, emulation engines for execution of extracted code (machine instructions, JavaScript etc.) and signature engines. To date all these detection mechanisms have been evaded at some point in time by malware that takes advantage of flaws in design, signatures or in the heuristics, etc. The engines can most of time detect known threats. The engine is static, and detects new threats via frequent updates.

Sandboxes can be used for malware detection. A sandbox is a software whose purpose is to have code executed and monitored inside a contained environment. The environment is called contained because, according to its design philosophy, the executed code only see's the sandboxing software as its execution environment, even though the sandbox itself may be running inside another software like the computer OS. Depending on what is being monitored and how its monitored, sandboxes may be classified as application sandboxes (e.g. opening PDF inside an instrumented PDF parser), virtual machine (VM) based sandboxes with in-VM agent, and agentless virtualization-based sandboxes.

The open source project Cuckoo is an example of a VM based sandbox with an in-VM agent. Sandboxes such as Cuckoo's can run on a variety of hypervisors like kernel based virtual machines (KVM), VirtualBox, etc. When a file is submitted to Cuckoo for analysis it uses a software preinstalled inside the guest VM. This preinstalled software renders the file samples inside its respective software, monitors all system activities and reports back to the Cuckoo process running on a separate host outside the VM. Due to the existence and use of user space process, a malware can detect if it is being analyzed by these sandboxes and take corrective measures, defeating the analysis process.

Endpoint detection and response (EDR) can run on a computer and scan for malicious activities on the computer.

EDR solutions typically combine multiple layers of detection which includes MD5 checks, static analysis on files, emulation of code and dynamic analysis. Almost all EDR solutions employ user space hooking which has serious limitations. It should be noted that EDR's can employ techniques used by sandboxes and vice versa. The division of capabilities isn't well defined. EDR is a modern take on code instrumentation and analysis and is more responsive to a threat compared to sandboxes.

EDR's are couple of steps ahead of AV in terms of analysis capabilities and response. As an example, from the moment a PDF file is opened an EDR software can monitor the Adobe reader process to check if any unusual activity like modifying critical registry settings, dropping files, process hijacking, etc. and if so prevent the PDF file from being rendered. Due to EDR implementation details, such as using user space hooking for dynamic analysis, there are malware samples that can detect, avoid detection by, and bypass modern EDR software.

Hypervisors with virtual machine introspection (VMI) support are examples of agentless virtualization-based sandboxes. VMI is a technique that can monitor the run time state of a guest VM by employing instrumentation within a hypervisor. The hypervisor can expose application program interfaces (APIs) that allow monitoring a guest OS. The virtual central processing unit (vCPU) registers and VM page tables can be exposed by the hypervisor through the APIs. A library like libVMI provides user space APIs which communicate with the hypervisor to gather the VM states. In addition, the library provides contextual information around the data obtained from the hypervisor. For example, the virtual address "0x77ff0001" means nothing until the library can say from which process context it was taken and associate it with the correct data structure and fields. This sematic gap is filled in by libraries like libVMI. For VMI to work the hypervisor should support it, there should be a library such as libVMI, and a user space program (a security product) that uses the library. VMI based products can inspect a guest VM without needing an agent running inside the VM and are thereby harder to detect than products having agents running within the VM.

The embodiments disclosed herein can run an instrumented guest VM within a host machine. The embodiments may have one or more agents because the instrumentation and classification can run as kernel drivers. The guest VM runs a guest OS that can be a UNIX based OS or can be a Windows OS. The guest OS can be instrumented with kernel mode drivers that monitor process, registry, filesystem, and network activity. A sample that may contain malware can be run within the guest VM. Existing kernel notification mechanisms are used to track sample activity within the guest VM. For a Windows VM, Windows Management Instrumentation (WMI) as well as the other kernel notification mechanisms can be used to track sample activity. Those practiced in the art are familiar with kernel notification mechanisms and with WMI which was introduced approximately twenty years ago with Windows 2000.

Previous techniques for detecting and countering malware have relied on offline examination of the sample and the crafting of countermeasures by experts. As such, new malware and variations of old malware can go undetected within a network until after security vendors detect the malware, after the security vendors update their security products, and after administrators install the updated security products within the network and on user's computers. The disclosed embodiments provide systems and method that can quickly respond to malware by automatically discovering the malware and generating a countermeasure. The highly crafted solutions provided by security vendors can be deployed at a later time when those solutions become available. Until that time, the automatically generated countermeasure can provide protection before the experts are even aware that the new malware exists.

Figure 1:
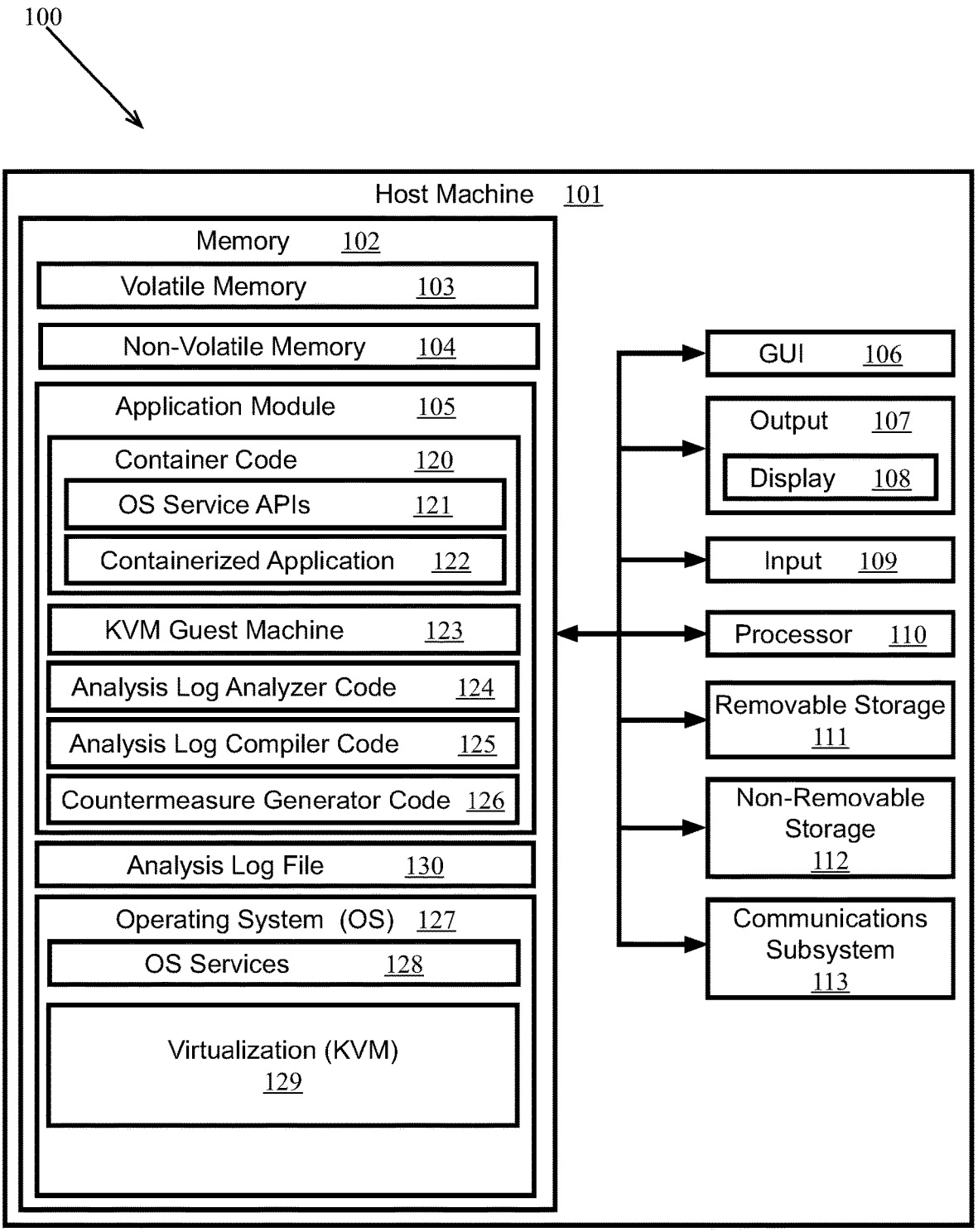
FIG. 1 is a high-level block diagram of a host machine that can run methods for automatically detecting malware and generating countermeasures, according to embodiments disclosed herein.

FIG. 1 is a high-level block diagram of a host machine 101 that can run methods for automatically detecting malware and generating countermeasures. A computing device in the form of a computer 101 configured to interface with controllers, peripheral devices, and other elements disclosed herein, may include one or more processing units 110, memory 102, removable storage 111, and non-removable storage 112. Memory 102 may include volatile memory 103 and non-volatile memory 104. Host machine 101 may include or have access to a computing environment that includes a variety of transitory and non-transitory computer-readable media such as volatile memory 103 and non-volatile memory 104, removable storage 111 and non-removable storage 112. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data. Of the listed computer storage, volatile memory and most RAM, such as DRAM (dynamic RAM), are transitory while the others are considered non-transitory.

Host machine 101 may include, or have access to, a computing environment that includes input 109, output 107, and a communications subsystem 113. The host machine 101 may operate in a networked environment using a communications subsystem 113 to connect to one or more remote computers, remote sensors and/or controllers, detection devices, hand-held devices, multi-function devices (MFDs), speakers, mobile devices, tablet devices, mobile phones, smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 107 is most commonly provided as a computer monitor or flat panel display but may include any output device. Output 107 and/or input 109 may include a data collection apparatus associated with host machine 101. In addition, input 109, which commonly includes a computer keyboard and/or pointing device such as a computer mouse, computer track pad, touch screen, or the like, allows a user to select and instruct host machine 101. A user interface can be provided using output 107 and input 109. Output 107 may include a display 108 for displaying data and information for a user, or for interactively displaying a GUI (graphical user interface) 106. A GUI is typically responsive of user inputs entered through input 109 and typically displays images and data on display 108.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 109 such as, for example, a pointing device such as a mouse, and/or with a keyboard. A particular item can function in the same manner to the user in all applications because the GUI provides standard software routines (e.g., the application module 105 can include program code in executable instructions, including such software routines) to handle these elements and report the user's actions.

Computer-readable instructions, for example, program code in application module 105, can include or be representative of software routines, software subroutines, software objects, etc. described herein, are stored on a computer-readable medium and are executable by the processor device (also called a processing unit) 110 of host machine 101. The application module 105 can include computer code such as container code 120, KVM guest machine 123, analysis log analyzer code 124, analysis log compiler code 125, countermeasure generator code 126. The container code 120 can include OS services APIs 121 and a containerized application 122. A hard drive, CD-ROM, RAM, Flash Memory, and a USB drive are just some examples of articles including a computer-readable medium.

The analysis log analyzer code 124 and the analysis log compiler code 125 can access an analysis log file 130 stored in memory 102. The host machine 101 has an operating system 127 providing OS services 128. The OS 127 can provide for virtualization 129 of guest machine. For example, Linux OSs can provide virtualization 129 using KVM. A host machine can provide for virtualization via KVM or via an underlying hypervisor that is not KVM. Embodiments can use KVM, or a hypervisor such as one of the VMware hypervisors 335 (e.g. VMware workstation, ESXi, and vSphere). The specific underlying hypervisor is an implementation detail that may have little to no effect on the embodiments.

Figure 2:
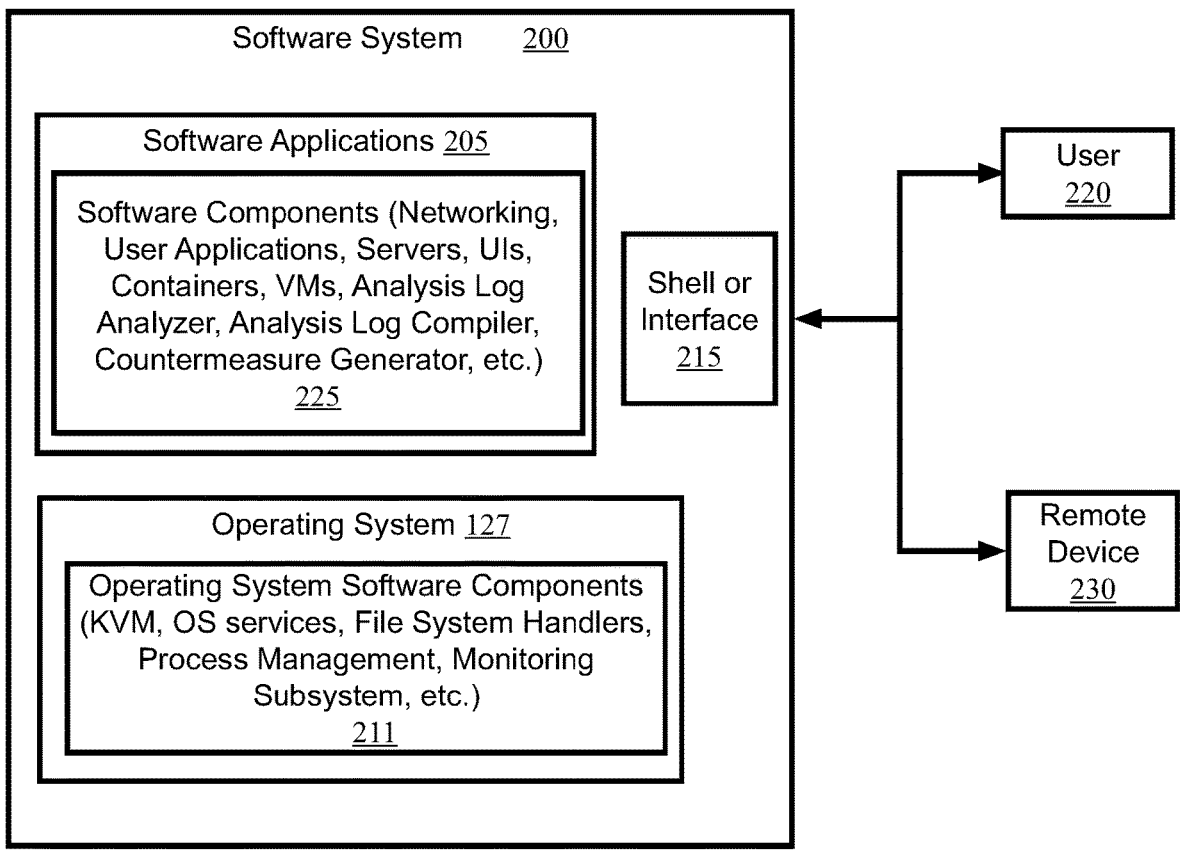
FIG. 2 is a high-level block diagram of a software system, according to embodiments disclosed herein.

FIG. 2 is a high-level block diagram of a software system 200, according to embodiments herein. FIG. 2 illustrates a software system 200, which may be employed for directing the operation of data-processing systems such as host machine 101. Software application 205, may be stored in memory 102, on removable storage 111 or on non-removable storage 112, and generally includes and/or is associated with an operating system 127 and a shell or interface 215. One or more application programs may be "loaded" (i.e., transferred from removable storage 111 or non-removable storage 112 into the memory 102) for execution by the host machine 101. An application program 205 can include software components 225 such as software modules, software subroutines, software objects, network code, user application code, server code, UI code, container code, VM code, analysis log code, analyzer code, analysis log compiler code, countermeasure generator code, etc. The software system 200 can have multiple software applications each containing software components. The host machine 101 can receive user commands and data through interface 215, which can include input 109, output 107, and communications connection 113 accessible by a user 220 or remote device 230. These inputs may then be acted upon by the host machine 101 in accordance with instructions from operating system 127 and/or software application 205 and any software components 225 thereof.

Generally, software components 225 can include, but are not limited to, routines, subroutines, software applications, programs, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component" and "module" as utilized herein may refer to one of or a collection of routines and data structures that perform a particular task or implement a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 106 that can display results, whereupon a user 220 or remote device 230 may supply additional inputs or terminate a particular session. In some embodiments, operating system 210 and GUI 106 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 210 and interface 215. The software application 205 can include, for example, software components 225, which can include instructions for carrying out steps or logical operations such as those shown and described herein.

The description herein is presented with respect to embodiments that can be embodied in the context of, or require the use of, a data-processing system such as host machine 101, in conjunction with program code in an application module 105 in memory 102, software system 200, or host machine 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Host machines 101 and software systems 200 can take the form of or run as virtual machines (VMs) or containers that run on physical machines. A VM or container typically supplies an operating environment, appearing to be an operating system, to program code in an application module and software applications 205 running in the VM or container. A single physical computer can run a collection of VMs and containers. In fact, an entire network data processing system including a multitude of host machines 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 3:
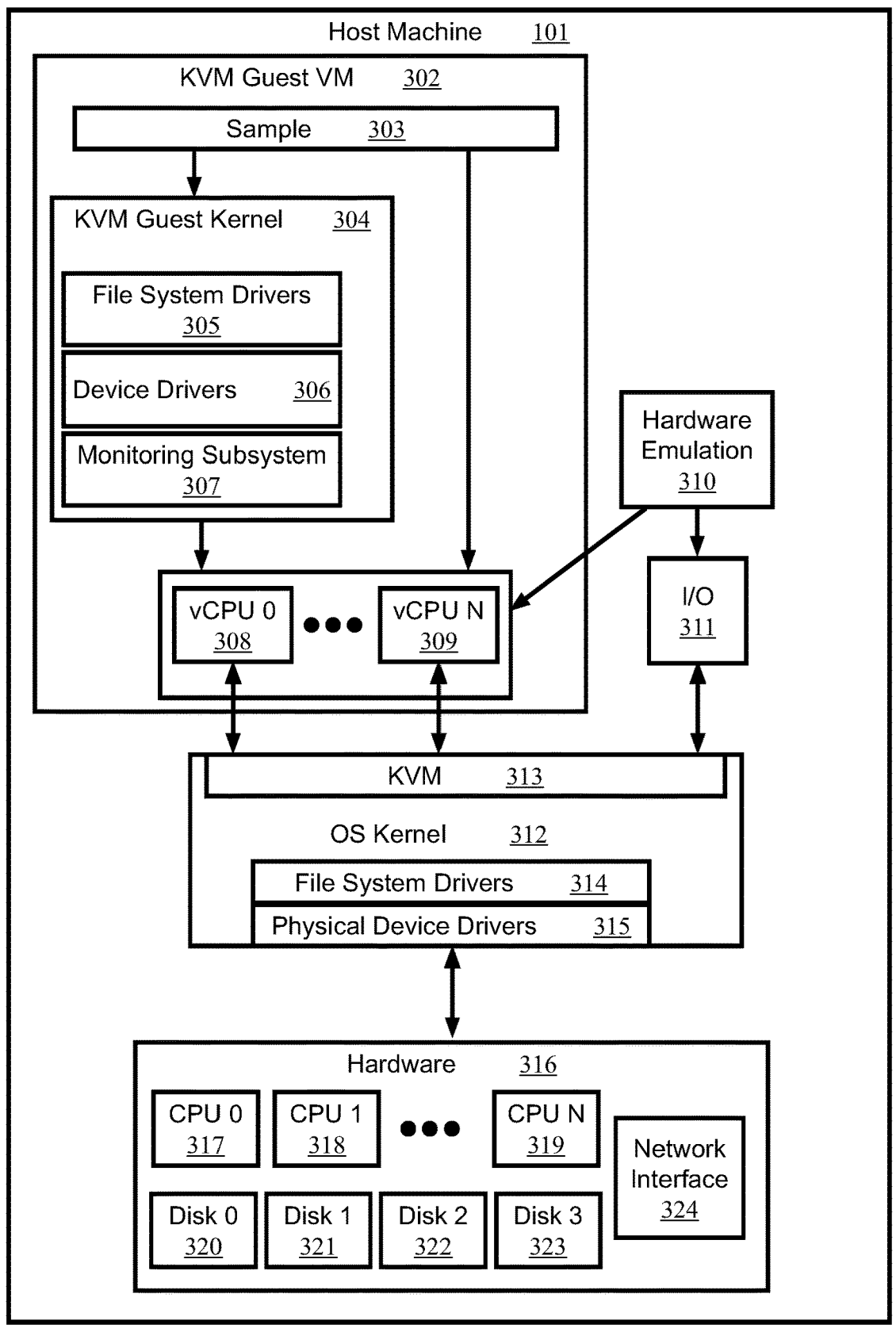
FIG. 3 is a high-level block diagram of a system for automatically detecting malware and generating countermeasures, according to embodiments disclosed herein.

FIG. 3 is a high-level block diagram of a system for automatically detecting malware and generating countermeasures. A host machine 101 is running a KVM guest VM 302. The host machine has hardware 316 including central processing units (CPUs), storage drives, and a network interface 324. The host machine 101 is illustrated as having multiple CPUs including CPU 0 317, CPU 1 318, and CPU N 319. The host machine 101 is illustrated as having multiple storage drives including disk 0 320, disk 1 321, disk 2 322 and disk 3 323. Those practiced in computers realize that the term "disk" is generally applied to many non-volatile memory devices including diskless devices such as solid-state drives (SSDs), etc.

The host machine 101 is running an OS kernel 312 having KVM 313, file system drivers 314, and physical device drivers 315. KVM 313 is a virtualization standard module in the Linux kernel. Other operating systems can have other virtualization modules that are similarly capable of providing services to a hosted VM. The hardware emulation 310 and I/O 311 are provided to the KVM guest VM 302 by the host machine 101.

From within the KVM guest VM 302 it appears that the KVM guest VM 302 is running on physical hardware. The KVM guest VM 302 has vCPUs, illustrated as vCPU 0 308 through vCPU N 319. Virtual disks are provided to the KVM guest machine 302 by the host machine 101 via KVM 313. As such, the file system drivers 305 and device drivers 306 of the KVM guest kernel 304 access those virtual disks. The virtual disks may be mapped onto the physical disks 320-323 and may be readable and writeable by the host machine 101. The device drivers 306 of the KVM guest VM 302 also access other virtualized devices such as virtualized versions of output 107, input 109, and communications subsystem 113. The KVM guest kernel 304 of the KVM guest VM 302 is illustrated as having an in-kernel monitoring subsystem 307. A sample 303 has been loaded into the KVM guest VM 302. The sample may contain malware infecting the KVM guest VM 302.

Figure 4:
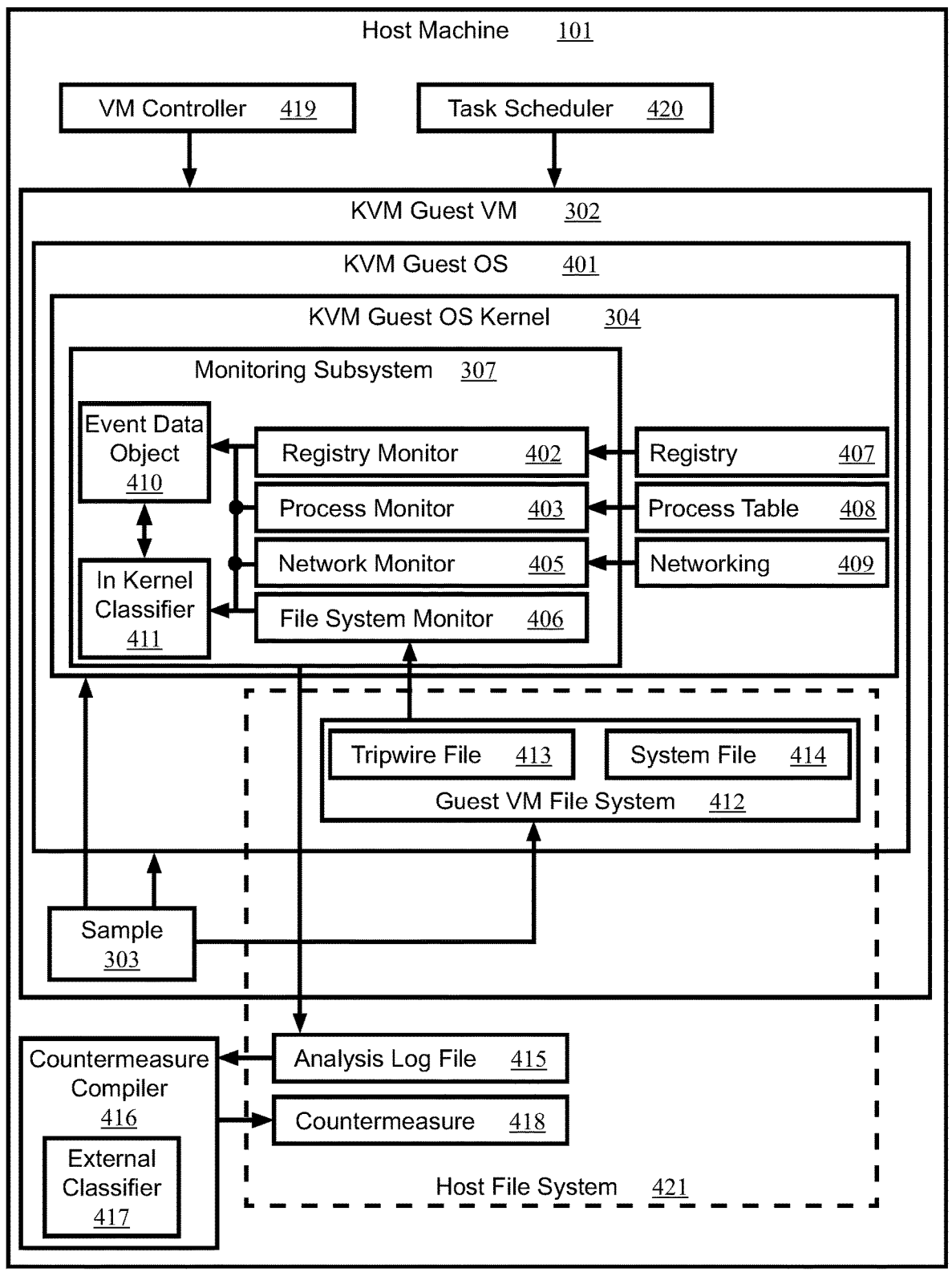
FIG. 4 illustrates high-level block diagram of a monitoring subsystem within a kernel-based virtual machine (KVM) guest operating system (OS) kernel, according to embodiments disclosed herein.

FIG. 4 illustrates high-level block diagram of a monitoring subsystem within a kernel-based virtual machine (KVM) guest operating system (OS) kernel 304. A VM controller 419 can start a KVM guest VM 302 from a VM snapshot or image and can halt, stop, or otherwise shut down KVM guest VM 302 once started. KVM guest VM 302 runs KVM guest OS 401 having KVM guest kernel 304. Here, the KVM guest OS 401 is shown as including the KVM guest kernel 304 because the KVM guest OS 401 may include non-kernel resources. The KVM guest kernel 304 is shown with four drivers that are part of the in-kernel monitoring subsystem 307. The four drivers are a registry monitor 402, a process monitor 403, a network monitor 405, and a file system monitor 406. At driver entry, the registry monitor 402 can register with the KVM guest kernel 304 to receive registry events affecting the registry 407. At driver entry, the process monitor 403 can register with the KVM guest kernel 304 to receive process events affecting processes running within the KVM guest VM 302, such as processes being created, stopped, or accessed. Process status may be stored in a process table 408. At driver entry, the network monitor 405 can register with the KVM guest kernel 304 to receive network events of the KVM guest VMs networking 409. At driver entry, the file system monitor 406 can register with the KVM guest kernel 304 to receive file system events affecting the guest VM file system 412. The VM's file system has system files 414 and a tripwire file 413. The drivers 402-406 can send event identifiers to the in-kernel classifier 411. The in-kernel classifier 411 can store the event identifiers in event data object 410. The monitoring subsystem 307 can also send event data to an analysis log file 415 that can be outside of the KVM guest VM 302.

The host file system 421 is illustrated with a dashed line illustrating that the host file system 421 contains the Guest VM file system 412. Depending on VM implementation and configuration, the host machine 101 may or may not have read/write/modify access to the tripwire file 413 and system file 414. The KVM guest VM 302 cannot read the analysis log file 415, countermeasure 418 or other files outside the guest VM file system 412.

A task scheduler 420 can instruct the KVM guest VM 302 to run a sample 303. While the sample runs it causes events that are observed by the drivers 402-406. For every event observed, a corresponding event identifier may be recorded in the event data object 410 and corresponding event data may be sent to the analysis log file 415. If the sample is classified as containing malware, a notification can be sent to or provided to the host machine 101, thereby triggering a countermeasure compiler 416 to generate a countermeasure 418. The analysis log can itself be analyzed by an external classifier 417 at any time, including after the KVM guest VM 302 is stopped or no longer exists. In this non-limiting example, the external classifier 417 is shown inside the countermeasure compiler 416. For simplicity, the host machine is illustrated as holding the analysis log file 415, countermeasure compiler 416, external classifier 417, and countermeasure 418. In practice, any computer, including another VM, may have the analysis log file 415, countermeasure compiler 416, and external classifier 417, and may generate the countermeasure 418.

Figure 5:
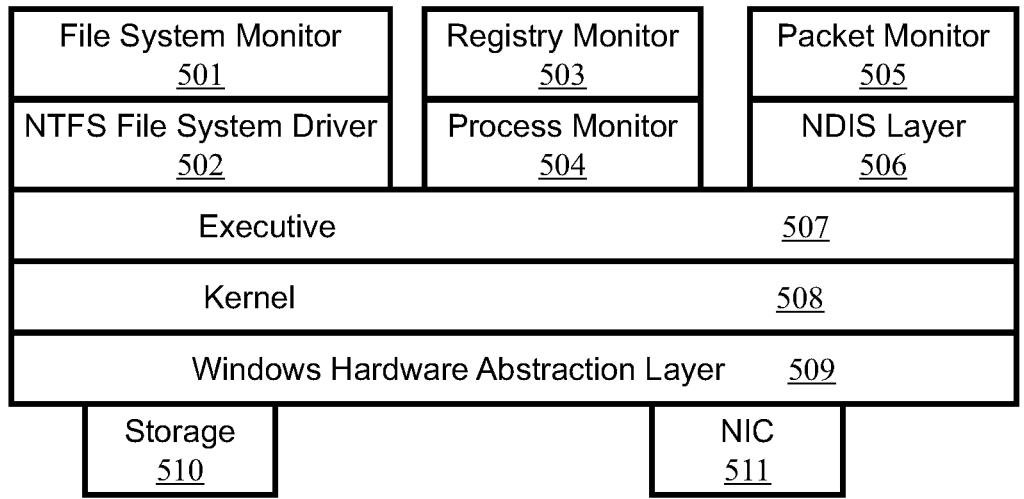
FIG. 5 is a high-level block diagram of a Windows OS with a monitoring subsystem, according to embodiments disclosed herein.

FIG. 5 is a high-level block diagram of a Windows OS with a monitoring subsystem, according to embodiments disclosed herein. The file system monitor can interact with the NTFS ("NT File System" or "New Technology File System") driver in order to monitor file events. The registry monitor 503 and process monitor 504 can interact with the Windows executive 507 or the Windows kernel 508 to receive events related to the Windows registry or processes. The packet monitor 505, which is a network monitor that may be implemented as a driver in the Windows kernel, can interact with the system's networking subsystem via the Windows Filtering Platform (WFP) framework, the Network Driver Interface Specification layer (NDIS), or transport driver interface (TDI) in order to monitor network events. The network monitor via the WFP framework, NDIS, or TDI monitors outgoing packets and processes packets that belong to the sample being analyzed inside the VM. Network monitoring can also be accomplished outside the VM by network monitoring tools such as WireShark. Wireshark is a well-known network monitoring tool that can run on many OSs, and can act as a software agent monitoring the Guest VM. As discussed above, an agent in the VM can be detected by malware. As such, the host can run Wireshark, or a similar application, to thereby monitor a guest VM's network activity. An in-kernel network monitor and classifier must use resources available within the kernel, such as NDIS. An alternative with external classifiers is to move the network monitor to the host machine, a router, a gateway, or some other machine through which the VMs network traffic must pass. The Windows kernel 509 rests on the Windows Hardware Abstraction Layer (HAL) which provides the kernel 508 with interfaces to abstract devices and translates the kernel's interactions with the abstract devices into interactions with specific devices. With VMs, the specific devices can be virtualized devices. The HAL can interact with physical devices, or virtualized physical devices, such as storage 510 and network interface card (NIC) 511.

Figure 6:
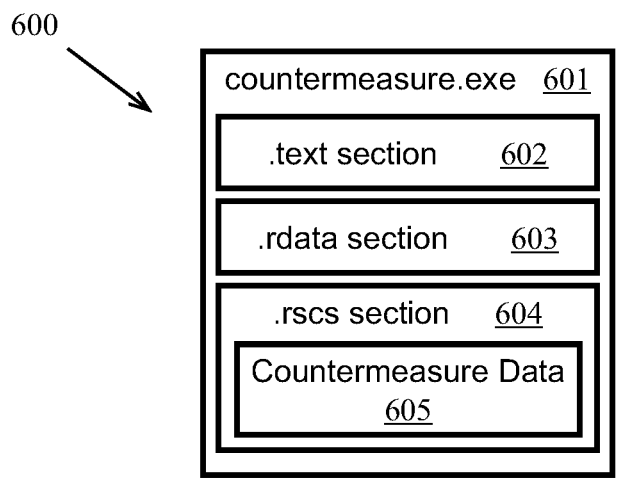
FIG. 6 illustrates a template executable for a countermeasure, according to embodiments disclosed herein.

FIG. 6 illustrates a template executable for a countermeasure 600. The countermeasure is illustrated as a windows executable, countermeasure.exe 601. Windows executables can be formatted according to a well-known specification called the portable execution file format. The illustrated executable has a text section 602 that can contain executable code, a rdata section 603 that can contain read only initialized data, and a resource section 604 that can contain resource data which is data that is usable by the executable code in the text section. The resource section 604 is shown containing countermeasure data 605. The countermeasure executable is configured for the executable code in the text section to access, interpret, and act in accordance with the countermeasure data. For example, the countermeasure data can indicate that a specific file is to be removed and a specific process is to be stopped. When executed, countermeasure.exe will remove that file and stop that process. A new countermeasure can be produced by placing new countermeasure data into the resource section 604 such that countermeasure.exe acts in accordance with the new countermeasure data. An original countermeasure program can be compiled, as programs normally are, to produce a precompiled template for countermeasures. Thereafter, an analysis log can be compiled to produce countermeasure data that can be added to the precompiled template to produce a countermeasure.

A countermeasure can also be produced by adding countermeasure data to source code and then compiling the source code. Such compilation, however, requires the proper computing environment and resources, such as a Windows programmer's work station, to produce the countermeasure. The pre-compiled template described above requires only that the countermeasure data be written into the template, which can be accomplished by a small simple program running under any operating system. As such, an Ubuntu host machine can run a sample in a Windows 10 VM, compile the analysis log, and produce the countermeasure.

Figure 7:
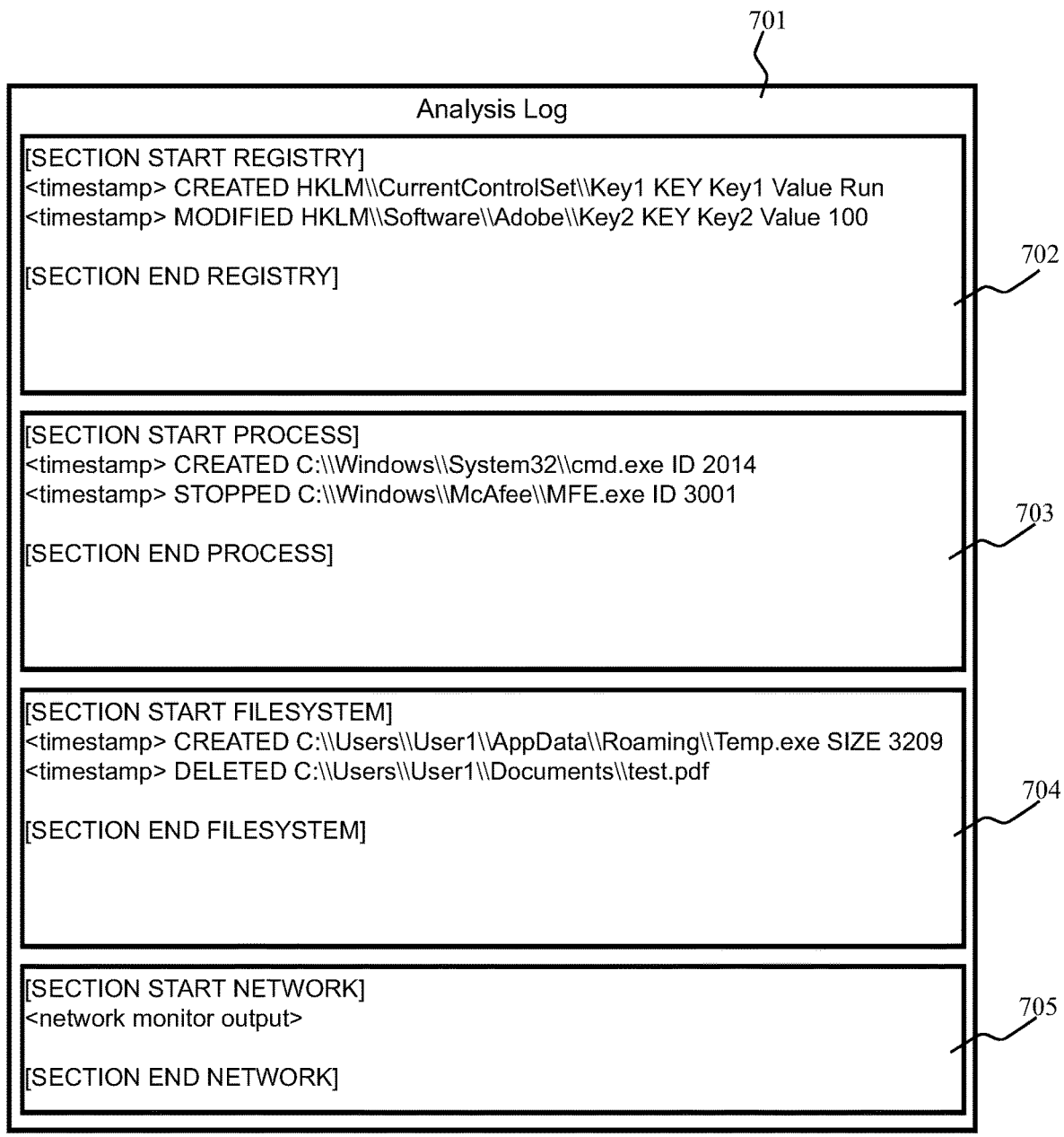
FIG. 7 illustrates a non-limiting example of an analysis log, according to embodiments disclosed herein.

FIG. 7 illustrates a non-limiting example of an analysis log 701. The analysis log can have sections such as a section for registry events 702, a section for process events 703, a section for file system events 704, and a section for network events 705. Such a log file can be produced by concatenating smaller log files or by some other means. An alternative could have no sections with each event tagged as a registry, process, file system, or network event. (E.g. each event begins with "PROCESS", "REGSITRY", "FILESYSTEM", or "NETWORK".) The registry event section 702 shows: a registry entry being created with the value "Run" being given to Key1; and a different registry entry being modified to have the value "100". The process event section 703 shows: a MFE.exe process being stopped. The MFE.exe process is a well-known anti-malware process. A sample stopping MFE.exe is almost certainly malware. The file system event section 704 shows: a temp.exe file being created in a specific user directory; and a document "test.pdf" being deleted in another user directory. Both actions appear malicious, but may be merely suspicious if those files are in some way reasonably related to the samples expected behavior. The network event section 705 is shown holding "network monitor output". The network monitor can be a kernel mode driver such as a WFP, NDIS, or TDI driver that can log all network activity, can log specific network activity (e.g. to/from blacklisted IP addresses and or ports, attempts to monitor certain ports, etc.), or can log all network activity except specific network activity (e.g. to/from whitelisted IP addresses and or ports, attempts to monitor certain ports, etc.). As discussed above, WireShark is a popular network monitoring tool that security professionals often configure to log malicious and suspicious network activity. An in-kernel network monitor (e.g. kernel mode WFP, NDIS, or TDI) can be configured in much the same way as WireShark is configured. A network monitor other than WireShark can be used.

Figure 8:
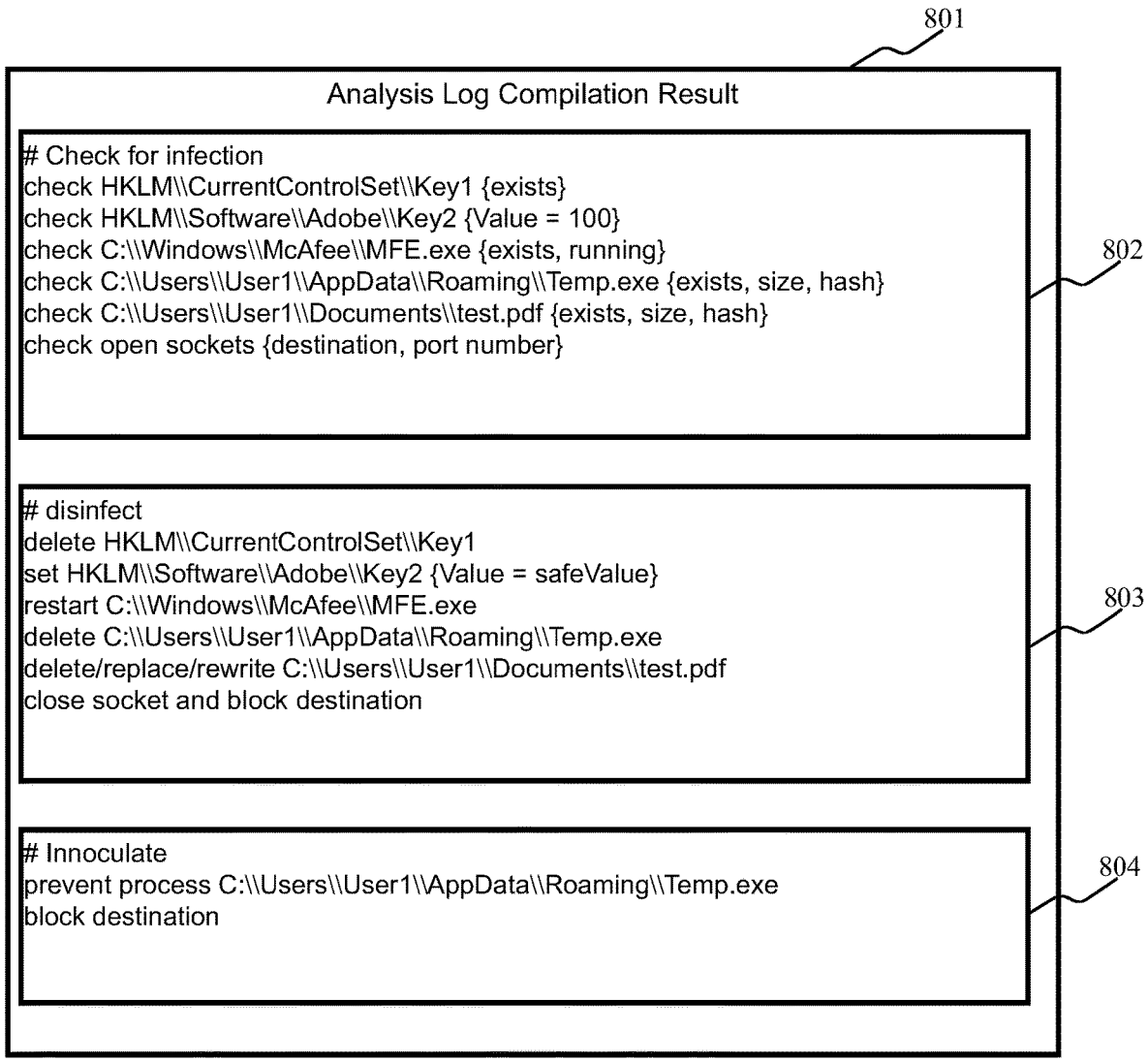
FIG. 8 illustrates a non-limiting example of an analysis log compilation result, according to embodiments disclosed herein.

FIG. 8 illustrates a non-limiting example of an analysis log compilation result 801. The analysis log compilation result is a non-limiting example of countermeasure data that can be inserted into a countermeasure template to thereby create a countermeasure. An inspection section 802 can check if a computer has been infected with the malware. A disinfection section 803 can remove the malware from an infected computer. An inoculation section 804 can inoculate a computer against the infection. The countermeasure can contain one or all of the sections 802, 803, 804. As such, running a countermeasure on a computer can detect the malware on the computer (inspect), remove the malware from the computer (disinfect), or prevent the computer from running a malware process (inoculate). As can be seen by comparing the analysis log to the analysis log compilation result, every line of the compilation result is based on a line in the analysis log. For example, "timestamp>CREATED HKLM\\CurrentControlSet\\Key1 KEY Key1 Value Run" is compiled into "check HKLM\\CurrentControlSet\\Key1 {exists}".

Every line of the analysis log can be written by the event monitor or another element of the system for automatically detecting malware and generating countermeasures. As such, the formats of the lines are known and well defined. The compiler can parse a line and generate the corresponding line of the analysis log compilation result. Techniques for parsing well defined formats and producing compiled outputs are well known in the art of computer programming.

Figure 9:
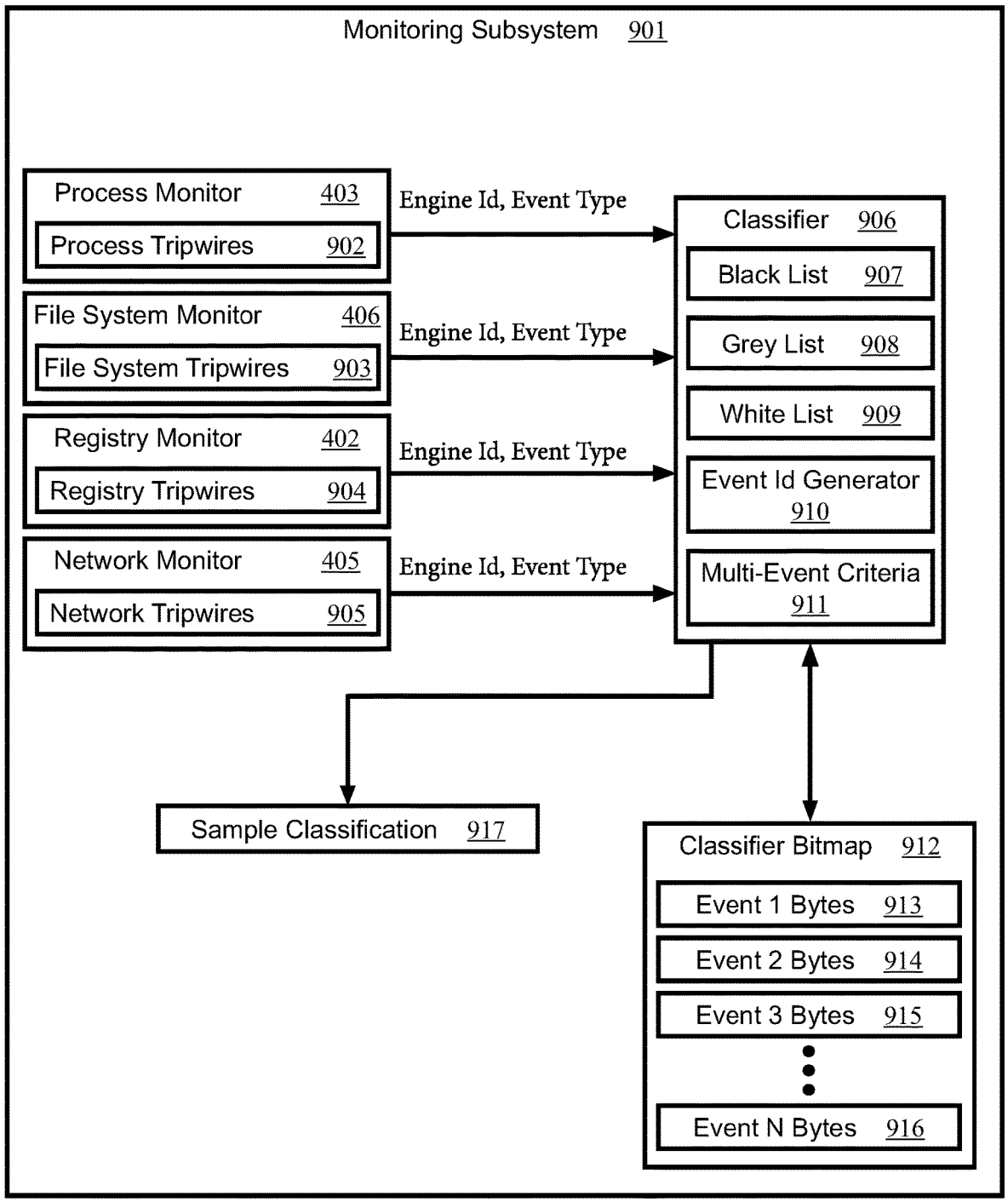
FIG. 9 is a high-level block diagram of a monitoring subsystem maintaining an in-kernel classifier bitmap, according to embodiments disclosed herein.

FIG. 9 is a high-level block diagram of a monitoring subsystem maintaining an in-kernel classifier bitmap. Each of the four drivers 402, 403, 405, 406 are shown with a tripwire. For in-kernel drivers, the tripwires can be registered with the kernel such that the kernel reports only certain events to the driver. Alternatively, a driver could receive every event and use the tripwires to determine if the event is reportable to the classifier. Yet another alternative is that the driver can register with the kernel for a class of events, such as process events, events related to system processes, etc. and then use the tripwire to determine if the event is reportable to the classifier. The class of events registered for can be specified by the tripwires. The process monitor 403 is shown with process tripwires 902. The file system monitor 406 is shown with file system tripwires 903. The registry monitor 402 is shown with registry tripwires 904. The network monitor 405 is shown with network tripwires 905.

The classifier 906 has a black list 907, grey list 908, white list 909, event Id generator 910, and multi-event criteria 911. A list, such as black list 907, grey list 908, and white list 909 specifies events. The events can be specified using patterns. Examples of patterns for process events include: any event for a specific process or set of process, every event of a specific type, a specific event type on a set of processes, a specific event type on any process except those listed, etc. File system, registry, and network events can be specified using similar patterns. Those skilled in examining digital data are familiar with such patterns. The black list 907 specifies events that are to be marked as malicious. When an event is marked as malicious, the sample classification 917 is set to mark the sample as malicious. Once marked as malicious, a sample can remain marked as malicious regardless of later events. The grey list 908 specifies events that are to be marked as suspicious. When an event is marked as suspicious, the sample classification 917 is set to mark the sample as suspicious. The white list 909 specifies events that are to be ignored. Suspicious and/or malicious events can be sent to the analysis log. Suspicious and malicious events can be recorded in the classifier bitmap 912. The classifier bitmap 912 is an example of the event data object 410 of FIG. 4.

The classifier bitmap is illustrated as having event identifiers for event 1 913, event 2 914, event 3 915, and event N 916. The variable "N" is used to indicate an integer and can take any value. For example, "Event N" of FIG. 9 could be the 20th event while "CPU N" of FIG. 3 could be the 4th CPU. The classifier bitmap is a data object and can be an in-kernel data object that is designed to consume a small amount of kernel memory in relation to other types of data objects such as JSON (javascript object notation) objects or XML (extensible markup language) objects. As such, the classifier bitmap is also designed to be more rapidly analyzable than other data objects, such as JSON or XML objects, because bitmaps can analyzed using simple logical comparison operations (OR, AND, XOR, . . . ) instead of string operations. The classifier 906 can examine the classifier bitmap to determine if the classifier bitmap matches any of the multi-event criteria 911 such that the sample classification is set to mark the sample as malicious. Examples of such criteria include too many suspicious events (too many indicated by the number of events exceeding a threshold value), too many events of a certain type, too many events of a set of certain types, etc. When the VM is shut down, the classifier can analyze the classifier bitmap to determine if the classifier bitmap matches any shutdown criteria (criteria checked at shutdown) such as too few suspicious events (too few indicated by the number of events being less than a threshold value), too few events of a certain type, too few events of a set of certain types, etc.

FIG. 10, which includes FIGS. 10A and 10B, illustrates non-limiting examples of a sample classification datum 1001, 1002 such as sample classification 917-. Sample classification 917 can be a single byte as shown in FIGS. 10A and 10B. The three rightmost bits can be used to indicate if the sample is clean, suspicious or malicious. Initially, the sample is marked a clean with bit 2 being "1" and bits 0 and 1 being 0. The sample can be marked as suspicious by setting bit 1 to "1". The sample can be marked as malicious by setting bit 0 to "1". If bit 0 is "1", then the sample is marked malicious regardless of the values of bits 1 and 2. If the sample is not malicious, then it is suspicious if bit 1 is "1", regardless of the value of bit 2. Note that bit 2 is used in this non-limiting example to provide clarity. Bit 2 can be always set to "1" and can therefore be ignored or omitted because the classification can depend wholly on bits 0 and 1. Sample classification datum 1001 indicates that a sample is currently marked clear (free of malware). Sample classification datum 1002 indicates that a sample is currently marked malicious (containing malware). A suspicious sample may contain malware, but has not been positively marked as containing malware.

FIG. 11 illustrates a non-limiting example of an event identifier 1101. The event bytes 913-916 of the classifier bitmap 912 can be event identifiers. Bits 8-15 are the engine identifier 1102 while bits 0-7 are the event type. The engine identifier 1102 indicates the source of the event. In a nonlimiting example, the engine identifier can be "1" for events from process monitor, "2" for events from the registry monitor, "3" for events from the file system monitor, "4" for events from the network monitor, and some other number for events from any other monitor within the monitoring subsystem. The event type has an event code 1104 and a classification marker 1103. The classification marker indicates whether the event is suspicious or malicious. As shown, the classification marker is a single byte and all event types are therefore suspicious or malicious. The event code indicates what event occurred. Each engine has its own event codes. For example, event code 0 for the process monitor can indicate the sample accessed a system process. Event code 0 for the file system monitor can indicate the sample deleted a file in a user directory.

FIG. 12 illustrates a method for automatically detecting malware and generating countermeasures 1200. The method of FIG. 12 can be implemented by a host machine 101. After the start, the system can run a virtual machine with an operating system configured with a monitoring subsystem 1201. The monitoring subsystem can be configured to generate event data based on a plurality of events occurring on the virtual machine. A classifier can be run, the classifier configured to detect a malware based on the plurality of events 1202. A sample can be run on the virtual machine 1203. While the sample runs, the classifier can detect malware in the sample. If malware is detected, a countermeasure compiler can be run 1204. The countermeasure compiler can generate a countermeasure to the malware, the countermeasure based on the event data.

FIG. 13 illustrates a method for a host machine to automatically classify a sample and generate a countermeasure 1300. The method of FIG. 13 can be implemented by a host machine 101. A sample is received 1301 and a VM is loaded and run 1302. The VM is infected with the sample 1303 by running the sample on the VM. For example, an executable file is caused to execute or a pdf file is opened by a pdf reader. Event data is collected into an analysis log 1304. An in-kernel classifier can analyze events for malware as the events are reported by an in-kernel monitoring subsystem 1305. A remote classifier can analyze events for malware as the events are reported and once reporting is done 1306. If the sample is classified as containing malware, the analysis log can be compiled to produce countermeasure data 1307. The countermeasure data can be placed into a countermeasure template to generate a countermeasure to the malware in the sample 1308.

FIG. 14 illustrates a process for a driver in an in-kernel monitoring subsystem 1400. When the VM is initialized, the driver and monitoring subsystem are initialized along with the rest of the OS kernel 1401. The driver can register with the kernel to be notified of specific events 1402. The driver receives an event notification 1403. In many embodiments the registered for events are all suspicious or malicious and the process goes directly from receiving an event notification 1403 to sending event identifiers 1406. In other embodiments, if the event is white listed 1404 it is ignored and the process loops back to waiting to receive an event 1403. If the event is reportable 1405, an event identifier can be sent to the in-kernel classifier 1406 and event data can be sent to the analysis log 1407. The process can then loop back to receive the next event 1403. An event is reportable if it is not white listed, if it is grey listed (suspicious), or if it is black listed (malicious). The event notification can be received with an event code or the driver can look to an internal table to determine which event code to assign to an event.

FIG. 15 illustrates a process for an in-kernel classifier 1500. When the VM is initialized, the in-kernel classifier is initialized along with the rest of the OS kernel 1501. An event identifier is received 1502 and a white list consulted 1503. If the event identifier is white listed it is ignored and the process loops back to waiting to receive an event 1502. An event that is not white listed is assumed to be suspicious. Some embodiments have no white list and every event identifier is assumed suspicious. The classifier can classify the event identifier as malicious 1504. For example, if the event identifier matches an entry or pattern in a black list, it is malicious. If malicious, the sample is marked as malicious 1506 and a notification can be sent indicating that the sample is malicious 1507. If the sample is not immediately identified as malicious, the classifier can determine if it is malicious in context 1505. For example, the classifier can examine the classifier bitmap to determine if the classifier bitmap matches any of the multi-event criteria. If not malicious, the process loops back to receiving the next event identifier 1502. Otherwise, the sample is marked as malicious 1506 and a notification can be sent indicating that the sample is malicious 1507. The process loops back to receiving the next event identifier 1502 after sending the notification 1507. The notification can be received from the VM or can be read from the VM. For example, the VM can be stopped and the host can examine the sample classification, which a stored in kernel memory, to determine the sample's classification.

FIG. 16 illustrates automatically producing, testing, and deploying a countermeasure 1600. After receiving notification that the sample is malicious 1601, the analysis log is compiled 1602 and a countermeasure produced 1603. The countermeasure can be tested 1604 on a test VM. For example, a test VM can be launched, inoculated using the countermeasure, and then infected with the sample. If malware is again detected, then the countermeasure may be ineffective. The countermeasure can be run on other computers 1605 to thereby detect infections, to disinfect, or to inoculate.

A non-limiting example of the embodiments is detailed below:
1. Host: Ubuntu 16.04 operating system running KVM. Can use VmWare Workstation 14 hypervisor or Ubuntu KVM hypervisor. VMcontroller.py script loads, starts, stops, and unloads VMs. TaskScheduler.py script runs sample on VM.
2. Guest VM: Windows 10 64 bit.
3. Monitoring Subsystem: Windows Kernel Mode drivers. At driver entry registers to be notified about various process, filesystem, registry and network events. Events logged to a file on a shared drive on the KVM host operating system.
4. VMcontroller.py: Python script that using libvirtd library to start a guest VM snapshot for analysis and shut down. (initial implementation loaded impacket library to communicate with the task scheduler service in the Windows VM to launch the file sample for analysis.) After a predefined time, the VM is shut down and the countermeasure compiler/generator is started.
5. TaskScheduler.py: Split from initial VM controller.py, communicates with the task scheduler service in the Windows VM to launch the file sample for analysis.
6. Analysis log Compiler/Generator. Windows program that takes the analysis log generated by the Kernel Mode Driver and compiles it into a windows PE resource, and adds it to the resource section of a precompiled windows 32 bit executable called "Scanner", detailed below). Runs under Windows and on Linux machine under Wine.
7. Countermeasure. A windows executable template file. At runtime it loads the resource section contained inside its own executable file, into its runtime memory. This resource was generated by the Analysis log Compiler/Generator. The resource contents have all the events generated by an analyzed sample. The countermeasure goes through this resource, item by item, and checks if the target computer has any of the symptoms associated with the events and optionally undo's it. The countermeasure template is common for all samples analyzed. It's the resource section inside the countermeasure executable that differentiates a countermeasure for one virus from another countermeasure for a different virus strain. So, at runtime the countermeasure behaves differently for different samples.
8. Tripwire files: files are randomly created in the VM filesystem as bait for ransomware and other malware. A hash or fuzzy hash of the file can verify if ransomware encrypted the file. Those practiced in the art know that fuzzy hashes are useful for determining that the changes in a file are not a ransomware encryption. The tripwire files are monitored by the file system monitor. A sample deleting or rewriting a tripwire file is malicious.
9. Tripwire processes: processes are created that appear to be anti-virus (AV) programs or anti-malware programs. The tripwire processes are monitored by the process monitor. A sample accessing or stopping a tripwire process is malicious.
10. Registry tripwires: Registry entries appearing to be those associated with anti-virus programs or anti-malware programs. The registry tripwires are monitored by the registry monitor. A sample accessing, deleting, or modifying a registry tripwire is malicious.
11. Fake AV: a sample that pretends to install or run fake AV is malicious. Fake AV can be detected as registry entries and fake AV processes.
12. Confuser: The confuser can change the tripwires each time the guest VM is launched.

Specific events are important to the process monitor and classifier. Those events include:
1. Process creation: Every process created and its child processes are tracked. This is not a malicious activity and is tracked for forensic purpose and antidote generation in the event the sample is eventually classified as malicious. This event will not affect the classifier bitmap.
2. Process termination: Normally a benign sample will not terminate another process on a system. Even in cases of software upgrades the process that's terminated is the one associated with the software being upgraded. In a controlled environment a sample should not terminate a process running inside the VM. This event is treated as malicious.
3. Process handle access (injection): A process opening a handle to another process is not unusual in a computer system. However, in the controlled environment of the VM where a sample is being analyzed, the sample opening a handle to another process should be treated as suspicious. If the access requested while opening the handle is: PROCESS_ALL_ACCESS, PROCESS_VM_WRITE, PROCESS_VM_OPERATION, PROCESS_TERMINATE or PROCESS_CREAT- E_THREAD it is malicious behavior. OpenProcess called with any other access is classified as suspicious.
4. Process handle access (credential theft): In Windows systems, the most common type of credential theft is having credentials dumped from the memory of the lsass process. If the analyzed sample calls OpenProcess to lsass.exe process, irrespective of the access mask, it will be treated as malicious.
5. Process creation (hollowing): In this technique a malware will request access to a process (OpenProcess) unmap it from memory and load its own code in place of the original process. This allows the malware to, loosely speaking, run under the identity of the unmapped process. These events are detected and treated as malicious.

Specific events are important to the file system monitor and classifier. Those events include:
1. File creation: Files being created on a system by a sample, benign or malicious, is common. This action will be tracked but not considered malicious. But two actions that will treat the sample as suspicious are files being created by the sample under the "System Startup Folder" or the "User Startup Folder", and the number of files created overall. Typically, the number of files created by a malware would be lesser than the number of files created by a software installer. As an experimental threshold the value is set to 15. If the number of files created is less than this threshold the sample will be treated as suspicious.
2. File deletion: Its common for a file, such as an installer, to setup temporary files and then delete them later. File deletion is a common event. Files being deleted from users "Desktop", "My Documents" and "Downloads" folder will be treated as malicious activity. In addition, the presence of tripwires will help confirm if the sample that deleted the file is a malware, especially if it's a ransomware. In the contained environment of the VM, deletion of files from any of the previously mentioned directories will be treated as malicious. Any other deletion will be treated as suspicious.

Specific events are important to the registry monitor and classifier. Those events include:
1. Registry creation: A set of important registry keys are tracked such as the winlogon keys, run keys, appinit_dll keys, image file option keys, etc. to see if anything is being added, modified or removed. These keys are used by malware to achieve persistence. Since these keys are also used by legitimate software, any action on these keys might not be classified as malicious. Any such action will be treated as suspicious. The classifier can use multi-event criteria to classify the sample. For a malware this event cannot happen in isolation. It would happen along with several other events tracked by the monitor subsystem. Some embodiments may treat changes to these keys as malicious. Other embodiments may treat changes to these keys as suspicious.
2. Registry deletion: A benign sample is not supposed to delete any registry entry other than the ones created by itself. In the controlled environment of the VM no registry deletions should happen. If the analyzed sample deletes keys created by itself those deletions are not treated as suspicious or malicious events. Any other deletion is classified as malicious.
3. Registry modification: A sample modifying registry keys created by itself will be treated as non-malicious. Modifying any other keys will be treated as suspicious. Modification to the tripwire keys or keys specifically tracked by the monitoring subsystem, like those associated with the windows firewall and windows defender, will be treated as malicious.

Specific events are important to the network monitor and classifier. Those events include:
1. Outgoing traffic: Outgoing traffic is monitored and the IP addresses visited by the sample and track ports opened by the sample are recorded in the analysis log. These events will not affect the classifier bitmap. A countermeasure may block traffic to those visited IP addresses and traffic sent to those ports.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
running a virtual machine (VM) that has an operating system configured with a monitoring subsystem, the monitoring subsystem configured to generate event data based on a plurality of events occurring on the virtual machine;
running a classifier configured to detect a malware based on the plurality of events;
running a sample on the virtual machine, the classifier detecting the malware in the sample;
running a countermeasure compiler that uses the event data to generate a countermeasure data for a countermeasure to the malware; and
producing the countermeasure by storing the countermeasure data in a resource data section of a precompiled template that includes executable code configured to interpret the countermeasure data,
wherein the countermeasure is an executable file, and
wherein executing the countermeasure on a computer executes the executable code to thereby inoculate the computer from infection by the malware or disinfect the computer by removing the malware from the computer,
wherein the monitoring subsystem is configured to:
run within a kernel of the operating system,
monitor a first process not associated with the sample,
monitor a second process,
monitor a tripwire file,
monitor a system file, and
to monitor an operating system registry; and
wherein the classifier is configured to:
run within the kernel of the operating system,
detect the malware based on the sample modifying the tripwire file,
detect the malware based on the sample modifying the system file,
detect the malware based on the sample terminating the first process,
detect the malware based on a type of access to the second process requested by the sample,
detect the malware based on an identity of the second process accessed by the sample, and
detect the malware based on the sample modifying or deleting a registry entry that the sample did not create.

2. The method of claim 1 wherein the classifier is run within a kernel of the operating system.

3. The method of claim 1 wherein detecting the malware triggers generating the countermeasure.

4. The method of claim 1 wherein:
the countermeasure compiler is configured to generate the countermeasure data by compiling an analysis log file comprising the event data; and
the VM cannot read the analysis log file.

5. The method of claim 1, the classifier configured to detect the malware based on the sample terminating a process monitored by the monitoring subsystem and that is not associated with the sample.

6. The method of claim 1, wherein running the countermeasure on the computer detects that the computer is infected with the malware.

7. The method of claim 1, wherein running the countermeasure on the computer removes the malware from the computer.

8. The method of claim 1, wherein running the countermeasure on the computer inoculates the computer from infection by the malware.

9. A system comprising:
a memory configured to store a precompiled template that includes executable code and a resource data section;
a processor operatively coupled to the memory and configured to run a virtual machine (VM) that is running an operating system, the VM configured to run a sample comprising a malware;
a monitoring subsystem running on the VM, the monitoring subsystem configured to generate event data based on a plurality of events occurring on the VM;
a classifier configured to detect the malware based on the plurality of events; and
a countermeasure compiler configured to generate a countermeasure data for a countermeasure to the malware from the event data,
wherein the countermeasure is an executable file produced by storing the countermeasure data in the resource data section,
wherein the executable code is configured to interpret the countermeasure data,
wherein executing the countermeasure on a computer executes the executable code and inoculates the computer from infection by the malware,
wherein the monitoring subsystem is configured to:
run within a kernel of the operating system,
monitor a first process not associated with the sample,
monitor a second process,
monitor a tripwire file,
monitor a system file, and
to monitor an operating system registry; and
wherein the classifier is configured to:
run within the kernel of the operating system,
detect the malware based on the sample modifying the tripwire file,
detect the malware based on the sample modifying the system file,
detect the malware based on the sample terminating the first process,
detect the malware based on a type of access to the second process requested by the sample,
detect the malware based on an identity of the second process accessed by the sample, and
detect the malware based on the sample modifying or deleting a registry entry that the sample did not create.

10. The system of claim 9, further including a classifier bitmap that includes a plurality of event identifiers, wherein:
each of the event identifiers includes an engine identifier that indicates a source of an event and an event code that indicates an event type; and
the classifier is configured to two of the event identifiers to detect the malware.

11. The system of claim 9 wherein the classifier is run within a kernel of the operating system.

12. The system of claim 9 wherein generating the countermeasure is triggered by detecting the malware.

13. The system of claim 9 wherein the countermeasure is configured to:
detect the malware on the computer,
remove the malware from the computer, and
prevent the computer from running a malware process.

14. A non-transitory computer readable medium storing computer readable instructions, that when executed on one or more processors, implements a method comprising:

running a virtual machine with an operating system configured with a monitoring subsystem, the monitoring subsystem configured to generate event data based on a plurality of events occurring on the virtual machine;

running a classifier configured to detect a malware based on the plurality of events;

running a sample on the virtual machine, the classifier detecting the malware in the sample; and running a countermeasure compiler that generates a countermeasure to the malware, the countermeasure based on the event data, wherein the countermeasure includes at least one executable instruction, wherein executing the at least one executable instruction on a computer inoculates the computer from infection by the malware, wherein the monitoring subsystem is configured to:
run within a kernel of the operating system,
monitor a first process not associated with the sample,
monitor a second process,
monitor a tripwire file, and
monitor a system file; and wherein the classifier is configured to:
detect the malware based on the sample modifying the tripwire file,
detect the malware based on the sample modifying the system file,
detect the malware based on the sample terminating the first process,
detect the malware based on a type of access to the second process requested by the sample, and
detect the malware based on an identity of the second process accessed by the sample.

15. The non-transitory computer readable medium storing computer readable instructions of claim 14, wherein the countermeasure is stored on a second non-transitory computer readable medium storing additional computer readable instructions, that when executed by a computer, implement a countermeasure method comprising:
detecting the malware on the computer, and
removing the malware from the computer.

* * * * *